United States Patent
Nobuta et al.

(10) Patent No.: US 6,785,366 B1
(45) Date of Patent: Aug. 31, 2004

(54) APPARATUS FOR MAKING OUTGOING CALL

(75) Inventors: Hiroshi Nobuta, Yamato (JP); Yasuhide Ueno, Hino (JP); Susumu Matsuzaki, Toride (JP); Takeshi Toyama, Hiratsuka (JP); Muneki Nakao, Kashiwa (JP); Naoki Sugawara, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/408,348

(22) Filed: Sep. 29, 1999

(30) Foreign Application Priority Data

Oct. 1, 1998 (JP) .......................................... 10-292785
Oct. 1, 1998 (JP) .......................................... 10-292787

(51) Int. Cl.$^7$ ............................. H04M 1/64; H04M 1/00
(52) U.S. Cl. ............................. 379/88.03; 379/88.01; 455/563
(58) Field of Search ..................... 379/88.01, 88.02, 379/88.03, 88.04, 93, 23, 67.1; 455/563, 564

(56) References Cited

U.S. PATENT DOCUMENTS

| | | | |
|---|---|---|---|
| 4,853,953 A | * 8/1989 | Fujisaki | 379/88.03 |
| 4,908,853 A | 3/1990 | Matsumoto | 379/355.09 |
| 5,165,095 A | * 11/1992 | Borcherding | 379/88.03 |
| 5,351,190 A | 9/1994 | Kondo | 704/8 |
| 5,459,778 A | 10/1995 | Takashima et al. | 379/356.01 |
| 5,805,672 A | * 9/1998 | Barkat et al. | 379/88.03 |
| 5,835,180 A | 11/1998 | Kakizawa | 379/165 |
| 5,915,239 A | * 6/1999 | Haavisto et al. | 704/270 |
| 5,982,875 A | * 11/1999 | Lieben et al. | 379/88.01 |
| 6,314,166 B1 | * 11/2001 | Laurila et al. | 379/88.01 |
| 6,359,971 B1 | * 3/2002 | Haimi-Cohen et al. | 379/88.01 |
| 6,393,304 B1 | * 5/2002 | Meche | 379/88.03 |

FOREIGN PATENT DOCUMENTS

| | | | |
|---|---|---|---|
| JP | 4-192852 | 7/1992 | H04M/1/27 |
| JP | 8-130574 | 5/1996 | H04M/1/27 |

* cited by examiner

*Primary Examiner*—Fan Tsang
*Assistant Examiner*—Ovidio Escalante
(74) *Attorney, Agent, or Firm*—Morgan & Finnegan, LLP

(57) ABSTRACT

Whether a call is placed after waiting for confirmation operation or without waiting for confirmation operation upon completion of speech recognition is selected. Data is initialized in the standby state, and upon instruction of speech recognition, speech recognition is done. The speech recognition result is displayed, and when a speech recognition key is operated without any confirmation operation, speech recognition is redone without setting the standby state.

14 Claims, 30 Drawing Sheets

|-+-+-+-+-+-+-+-+-+-+-+-+-+-+-+-|
   S E T   K E Y - R E G I S T E R

|-+-+-+-+-+-+-+-+-+-+-+-+-+-+-+-|
```

FIG. 5A

INPUT POSITION
(BLACK CURSOR POSITION = INPUT POSITION)

[RESET 9] WHEN THE NUMBER OF REST DATA IS INDICATED BY 1s DIGIT
[REST 0] WHEN THE NUMBER OF REST DATA IS ZERO

|-+-+-+-+-+-+-+-+-|-|-|-+-+-+-+-+-|-|-
    K I M U R A      W A T A R U   V

|-+-+-+-+-+-+-+-+-|-|-|-+-+-+-+-+-|-|-
```

|-+-+-+-+-+-+-+-+-|-|-|-+-+-+-+-+-|-|-
  A B C D E    a b c d e   ➤ E N D

|-+-+-+-+-+-+-+-+-|-|-|-+-+-+-+-+-|-|-
```

|-+-+-+-+-+-+-+-+-|-|-|-+-+-+-+-+-|-|-
  P Q R S T    p q r s t   ➤ E N D

|-+-+-+-+-+-+-+-+-|-|-|-+-+-+-+-+-|-|-
```

FIG. 8A
```
   01 02 03 04 05 06 07 08 09 10 11 12 13 14 15 16
   |--|--|--|--|--|--|--|--|--|--|--|--|--|--|--|--|
    T  A  M  U  R  A     T  A  K  U  Y  A

|--|--|--|--|--|--|--|--|--|--|--|--|--|--|--|--|
    T  E  L  =  0  4        0  1  2  3        0  1  2  3

|--|--|--|--|--|--|--|--|--|--|--|--|--|--|--|--|
```

FIG. 8B
```
   01 02 03 04 05 06 07 08 09 10 11 12 13 14 15 16
   |--|--|--|--|--|--|--|--|--|--|--|--|--|--|--|--|
    T  A  M  U  R  A     T  A  K  U  Y  A

|--|--|--|--|--|--|--|--|--|--|--|--|--|--|--|--|
    T  E  L  =                                 0  3

|--|--|--|--|--|--|--|--|--|--|--|--|--|--|--|--|
```

|-|-+-+-+-+-+-+-|-|-|-|-+-+-+-+-|-
➤ Y E S    N O

|-|-+-+-+-+-+-+-|-|-|-|-+-+-+-+-|-
```

|-|-+-+-+-+-+-+-|-|-|-|-+-+-+-+-|-
➤ Y E S    N O

|-|-+-+-+-+-+-+-|-|-|-|-+-+-+-+-|-
```

|--+--+--+--+--+--+--+--+--+--+--+--+--+--+--+--|
  I  N  O  U  E                                V

|--+--+--+--+--+--+--+--+--+--+--+--+--+--+--+--|
```

FIG. 11B
```
 01 02 03 04 05 06 07 08 09 10 11 12 13 14 15 16
|--+--+--+--+--+--+--+--+--+--+--+--+--+--+--+--|
  A  I  K  A  W  A

|--+--+--+--+--+--+--+--+--+--+--+--+--+--+--+--|
➤ I  N  O  U  E                                V

|--+--+--+--+--+--+--+--+--+--+--+--+--+--+--+--|
```

FIG. 11C
```
 01 02 03 04 05 06 07 08 09 10 11 12 13 14 15 16
|--+--+--+--+--+--+--+--+--+--+--+--+--+--+--+--|
➤ I  N  O  U  E                                V

|--+--+--+--+--+--+--+--+--+--+--+--+--+--+--+--|
  I  S  H  I  K  A  W  A

|--+--+--+--+--+--+--+--+--+--+--+--+--+--+--+--|
```

F I G. 12A

```
   01 02 03 04 05 06 07 08 09 10 11 12 13 14 15 16
  |-+-+-+-+-+-+-+-+-+-+-+-+-+-+-+-+-|
  ➤ I  N  O  U  E                                V

|-+-+-+-+-+-+-+-+-+-+-+-+-+-+-+-+-|
    I  S  H  I  K  A  W  A

|-+-+-+-+-+-+-+-+-+-+-+-+-+-+-+-+-|
```

F I G. 12B

```
   01 02 03 04 05 06 07 08 09 10 11 12 13 14 15 16
  |-+-+-+-+-+-+-+-+-+-+-+-+-+-+-+-+-|
  ➤ I  N  O  U  E                                V

|-+-+-+-+-+-+-+-+-+-+-+-+-+-+-+-+-|
    T  E  L  =  0  4  7  1     1  2     1  2  3  4

|-+-+-+-+-+-+-+-+-+-+-+-+-+-+-+-+-|
```

|-+-+-+-+-+-+-+-+-+-+-+-+-+-+-+-+-|
  →Y E S           N O

|-+-+-+-+-+-+-+-+-+-+-+-+-+-+-+-+-|
```

FIG. 14B
```
  01 02 03 04 05 06 07 08 09 10 11 12 13 14 15 16
  |-+-+-+-+-+-+-+-+-+-+-+-+-+-+-+-+-|
  P I C K   U P     H A N D S E T

|-+-+-+-+-+-+-+-+-+-+-+-+-+-+-+-+-|

|-+-+-+-+-+-+-+-+-+-+-+-+-+-+-+-+-|
```

FIG. 14C
```
  01 02 03 04 05 06 07 08 09 10 11 12 13 14 15 16
  |-+-+-+-+-+-+-+-+-+-+-+-+-+-+-+-+-|
  A F T E R   B E E P   T O N E

|-+-+-+-+-+-+-+-+-+-+-+-+-+-+-+-+-|
  I N P U T   S P E E C H

|-+-+-+-+-+-+-+-+-+-+-+-+-+-+-+-+-|
```

FIG. 14D
```
  01 02 03 04 05 06 07 08 09 10 11 12 13 14 15 16
  |-+-+-+-+-+-+-+-+-+-+-+-+-+-+-+-+-|
  I N P U T   S P E E C H

|-+-+-+-+-+-+-+-+-+-+-+-+-+-+-+-+-|

|-+-+-+-+-+-+-+-+-+-+-+-+-+-+-+-+-|
```

|--|--|--|--|--|--|--|--|--|--|--|--|--|--|--|--|

|--|--|--|--|--|--|--|--|--|--|--|--|--|--|--|--|
```

|--|--|--|--|--|--|--|--|--|--|--|--|--|--|--|--|

|--|--|--|--|--|--|--|--|--|--|--|--|--|--|--|--|
```

|--|--|--|--|--|--|--|--|--|--|--|--|--|--|--|--|
 T  W  O     M  O  R  E     T  I  M  E  S

|--|--|--|--|--|--|--|--|--|--|--|--|--|--|--|--|
```

FIG. 16A
```
01 02 03 04 05 06 07 08 09 10 11 12 13 14 15 16
|-+-+-+-+-+-+-+-+-+-+-+-+-+-+-+-+-
 C O N T .   R E G I S T R E R
|-+-+-+-+-+-+-+-+-+-+-+-+-+-+-+-+-

|-+-+-+-+-+-+-+-+-+-+-+-+-+-+-+-+-
```

FIG. 16B
```
01 02 03 04 05 06 07 08 09 10 11 12 13 14 15 16
|-+-+-+-+-+-+-+-+-+-+-+-+-+-+-+-+-
 R E P L A C E   H A N D S E T
|-+-+-+-+-+-+-+-+-+-+-+-+-+-+-+-+-

|-+-+-+-+-+-+-+-+-+-+-+-+-+-+-+-+-
```

|-+-+-+-+-+-+-+-|-|-|-+-+-+-+-+-|-

|-+-+-+-+-+-+-+-|-|-|-+-+-+-+-+-|-
```

FIG. 17B
```
01 02 03 04 05 06 07 08 09 10 11 12 13 14 15 16
|-+-+-+-+-+-+-+-|-|-|-+-+-+-+-+-|-
 A F T E R   B E E P   T O N E

|-+-+-+-+-+-+-+-|-|-|-+-+-+-+-+-|-
 I N P U T   S P E E C H

|-+-+-+-+-+-+-+-|-|-|-+-+-+-+-+-|-
```

FIG. 17C
```
01 02 03 04 05 06 07 08 09 10 11 12 13 14 15 16
|-+-+-+-+-+-+-+-|-|-|-+-+-+-+-+-|-
 I N P U T   S P E E C H

|-+-+-+-+-+-+-+-|-|-|-+-+-+-+-+-|-

|-+-+-+-+-+-+-+-|-|-|-+-+-+-+-+-|-
```

FIG. 17D
```
01 02 03 04 05 06 07 08 09 10 11 12 13 14 15 16
|-+-+-+-+-+-+-+-|-|-|-+-+-+-+-+-|-
 I N P U T T I N G   S P E E C H

|-+-+-+-+-+-+-+-|-|-|-+-+-+-+-+-|-

|-+-+-+-+-+-+-+-|-|-|-+-+-+-+-+-|-
```

|-|-|-|-|-|-|-|-|-|-|-|-|-|-|-|-|-|
T E L =     0 1 2 3 4 5 6 7 8 9

|-|-|-|-|-|-|-|-|-|-|-|-|-|-|-|-|-|
```

|-|-|-|-|-|-|-|-|-|-|-|-|-|-|-|-|-|
S E T   K E Y - D I A L I N G

|-|-|-|-|-|-|-|-|-|-|-|-|-|-|-|-|-|
```

|-|-+-+-+-+-+-+-|-|-|-+-+-+-+-+-|-

|-|-+-+-+-+-+-+-|-|-|-+-+-+-+-+-|-
```

|-|-+-+-+-+-+-+-|-|-|-+-+-+-+-+-|-
I N P U T    S P E E C H

|-|-+-+-+-+-+-+-|-|-|-+-+-+-+-+-|-
```

|-|-+-+-+-+-+-+-|-|-|-+-+-+-+-+-|-

|-|-+-+-+-+-+-+-|-|-|-+-+-+-+-+-|-
```

|-|-+-+-+-+-+-+-|-|-|-+-+-+-+-+-|-

|-|-+-+-+-+-+-+-|-|-|-+-+-+-+-+-|-
```

|-|-+-+-+-+-+-+-|-|-|-+-+-+-+-+-+-|
T E L =       0 1 2 3 4 5 6 7 8 9

|-|-+-+-+-+-+-+-|-|-|-+-+-+-+-+-+-|
```

|-|-+-+-+-+-+-+-|-|-|-+-+-+-+-+-+-|
S E T   K E Y - D I A L I N G

|-|-+-+-+-+-+-+-|-|-|-+-+-+-+-+-+-|
```

|-+-+-+-+-+-+-+-+-+-+-+-+-+-+-+-|
→Y E S     N O

|-+-+-+-+-+-+-+-+-+-+-+-+-+-+-+-|
```

|-+-+-+-+-+-+-+-+-+-+-+-+-+-+-+-|
 D E L E T E ?   →Y E S     N O

|-+-+-+-+-+-+-+-+-+-+-+-+-+-+-+-|
```

|-+-+-+-+-+-+-+-+-+-+-+-+-+-+-+-|
 D E L E T E D

|-+-+-+-+-+-+-+-+-+-+-+-+-+-+-+-|
```

| SPEECH RECOGNITION START COMMAND | PROCESSING TYPE | REGISTRATION NUMBER | RESULT DATA REAQUESTED FOR SPEECH RECOGNITION TASK |
|---|---|---|---|
| COMMAND 0 | DELETE REGISTRATION | ○ | — |
| COMMAND 1 | REGISTRATION | ○ | ONLY OK/NG |
| COMMAND 2 | REGISTRATION | ○ | OK/NG (WITH REASON CODE WHEN NG) |
| COMMAND 3 | RECOGNITION | — | WHEN OK...REGISTRATION NUMBER FOUND BY RECOGNITION WHEN NG...NG |
| COMMAND 4 | RECOGNITION | — | WHEN OK...REGISTRATION NUMBER FOUND BY RECOGNITION WHEN NG...REASON CODE FOR NG |
| COMMAND 5 | LIMITED RECOGNITION | ○ (PLURAL DESIGNATIONS ALLOWED) | WHEN OK...REGISTRATION NUMBER FOUND BY RECOGNITION WHEN NG...NG |
| COMMAND 6 | LIMITED RECOGNITION | ○ (PLURAL DESIGNATIONS ALLOWED) | WHEN OK...REGISTRATION NUMBER FOUND BY RECOGNITION WHEN NG...REASON CODE FOR NG |

FIG. 25

| SPEECH RECOGNITION RESULT COMMAND | PROCESSING TYPE | REGISTRATION NUMBER | RESULT DATA SENT TO OPERATE TASK |
|---|---|---|---|
| COMMAND 1 | REGISTRATION | ○ | ONLY OK/NG |
| COMMAND 2 | REGISTRATION | ○ | OK/NG (WITH REASON CODE WHRN NG) |
| COMMAND 3 | RECOGNITION | ○ | WHEN OK...REGISTRATION NUMBER FOUND BY RECOGNITION<br>WHEN NG...NG |
| COMMAND 4 | RECOGNITION | ○ | WHEN OK...REGISTRATION NUMBER FOUND BY RECOGNITION<br>WHEN NG...REASON CODE FOR NG |

FIG. 26

| REASON CODE | PROCESSING TYPE | REASON CONTENTS |
|---|---|---|
| R01 | RECOGNITION | NO SPEECH REGISTRATION DATA TO BE COMPARED |
| R02 | RECOGNITION/REGISTRATION | NO EFFECTIVE SPEECH INPUT DATA (DUE TO SILENCE OR NOISE) |
| R03 | RECOGNITION | NO MATCHING DATA |
| R04 | RECOGNITION | NO MORE DATA REGISTERED (SPEECH REGISTRATION MEMORY OVERFLOW) |
| R05 | RECOGNITION/REGISTRATION | INPUT TIME OVER (SPEECH INPUT MORE THAN 3 SEC) |
| R06 | RECOGNITION/REGISTRATION | TOO HIGH INPUT VOLUME (TOO LOUD VOICE OR TOO CLOSE MICROPHONE POSITION) |
| R07 | RECOGNITION/REGISTRATION | PROCESSING INTERRUPTED BY USER (BY PRESSING STOP KEY OR REPLACING HANDSET) |

APPARATUS FOR MAKING OUTGOING CALL

BACKGROUND OF THE INVENTION

1. Field of the Invention

The present invention relates to an apparatus which makes an outgoing call and has a speech recognition function.

2. Description of the Related Art

As a conventional communication apparatus, an apparatus having a function of registering a plurality of destination numbers in one-touch keys or abbreviation keys, or a phonebook function of registering abbreviations and numbers of destinations, and allowing the user to select the destination wanted while displaying them is known.

To improve operability, a technique for recognizing the dial number of a destination by a speech recognition function has been proposed.

However, in a speech recognition destination selection function which searches registered speech data for a match by speech recognition, and selecting a destination dial corresponding to the matched speech data, if ambient noise is superposed on input speech, or if the input speech level is too small or large, recognition errors may occur. That is, recognition errors do take place due to differences between the environment upon registering speech data, and that upon speech recognition.

For this reason, when the first attempt results in a destination recognition error, the operator stops the apparatus to inhibit it from starting dialing, and must redo destination selection by means of speech recognition from the beginning. In this manner, when recognition errors have occurred, operations are very tedious.

Upon identification of speech data by a speech recognition algorithm which is premised on a specific talker in principle, input speech data is collated with registered speech data of a predetermined person to recognize speech. Hence, collation often fails if a person other than the person who has registered the speech data inputs speech.

Upon inputting speech data to be recognized, ambient noise may be mixed and result in recognition errors.

When even the same person as the person who has registered speech data inputs speech, if he or she is in bad health, recognition errors may still occur. As a result, sometimes the operator does not notice a wrong destination dial number selected by a recognition error, and a call is placed to a wrong destination.

SUMMARY OF THE INVENTION

It is an object of the present invention to improve an apparatus which makes an outgoing call and has a speech recognition function.

It is another object of the present invention to improve operation for redoing speech recognition upon calling.

It is still another object of the present invention to provide an apparatus for making an outgoing call, which can place a call by simple operation when speech recognition is more likely to succeed, and can prevent a wrong call when speech recognition is more likely to fail.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 shows a display screen of phonebook registration;

FIGS. 5A to 5C show an input screen upon registering a phonebook;

FIGS. 6A and 6B show a registration screen of speech data;

FIGS. 7A to 7C show a display screen upon correcting the registered contents of the phonebook;

FIGS. 8A and 8B show selection/movement of a candidate character;

FIGS. 9A and 9B show a registration screen of speech data;

FIGS. 10A to 10D show a screen upon deleting phonebook data;

FIGS. 11A to 11C show a screen upon searching the phonebook;

FIGS. 12A and 12B show a screen upon making number display (detailed display);

FIGS. 13A to 13C show a screen when a user abbreviation is selected and a set key 310 is pressed;

FIGS. 14A to 14D show a screen upon registering speech data;

FIGS. 15A to 15C show a screen upon registering speech data;

FIGS. 16A to 16D show a screen upon registering speech data;

FIGS. 17A to 17D show a screen upon calling by means of speech recognition;

FIGS. 18A and 18B show a screen upon calling by means of speech recognition;

FIGS. 19A to 19D show a screen upon calling by pressing a speech recognition key after the user picks up a handset;

FIGS. 20A and 20B show a screen upon calling by pressing the speech recognition key after the user picks up the handset;

FIGS. 21A to 21C show a screen upon deleting speech data;

FIG. 24 is a table showing the contents of a speech recognition start command;

FIG. 25 is a table showing the contents of a speech recognition start command;

FIG. 26 is a table showing the contents of a reason code;

DETAILED DESCRIPTION OF THE PREFERRED EMBODIMENTS

A preferred embodiment of an apparatus for making an outgoing call, a method for making an outgoing call, and a storage medium according to the present invention will be described hereinafter.

In an example to be described below, the present invention is applied to a facsimile apparatus which mounts an analog low-power type cordless telephone function, and has functions that satisfy the ITU recommendation G3 standards.

The present invention can also be applied to an apparatus for making an outgoing call, which does not comprise any cordless telephone, and can be applied to an apparatus for making an outgoing call, which does not comprise any facsimile function. Furthermore, the present invention can be applied to an apparatus for making an outgoing call, which does not have any automatic answering function.

An apparatus for making an outgoing call to be described below comprises a color reading unit and color recording unit, and has a color copy function and color image communication function. Also, the apparatus has a phonebook function of making automatic destination dialing to a corresponding destination number by allowing the user to select a destination abbreviation stored for the purpose of a facsimile communication or telephone conversation, and a speech recognition function of recognizing a destination abbreviation selected by the phonebook function based on speech by a speech recognition unit.

Figure 1:
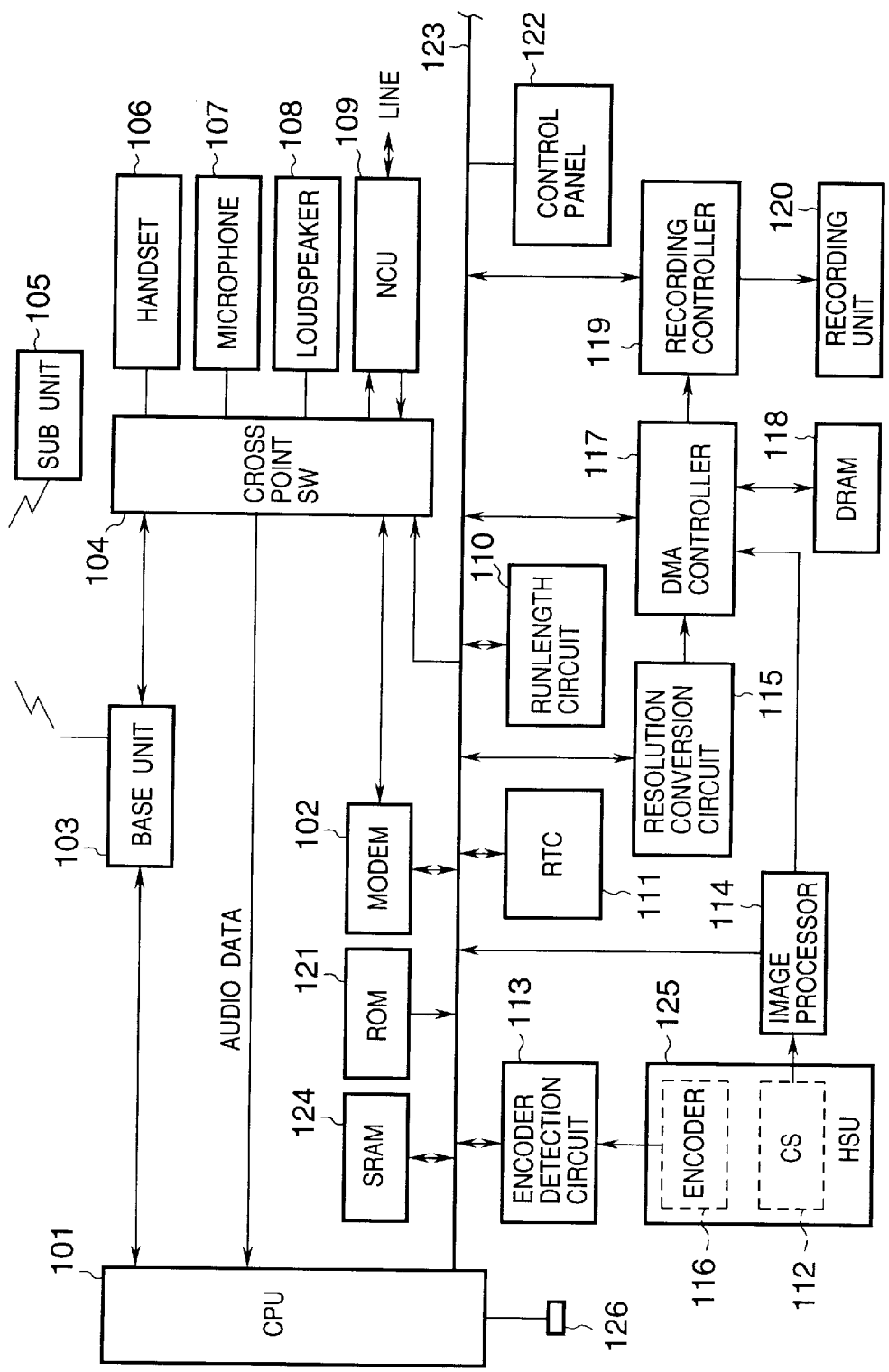
FIG. 1 is a block diagram showing the hardware arrangement of a facsimile apparatus.

FIG. 1 is a block diagram showing the hardware arrangement of an apparatus for making an outgoing call. Referring to FIG. 1, reference numeral 101 denotes a CPU serving as a controller of this apparatus. Reference numeral 121 denotes a ROM which stores programs and various permanent data. Reference numeral 118 denotes a DRAM which is used as a work memory for various programs, and a memory for storing audio data for, e.g., an automatic answering function, and monochrome and color image data. The DRAM has a total memory size of 2 MB, 0.5 MB of which are used as the work memory, and the remaining 1.5 MB of which are used for storing image and audio data.

Reference numeral 124 denotes an SRAM for registering and storing registration data (various software switches, phonebook data, registered speech data for speech recognition, and apparatus ID data such as the telephone number, abbreviation, and the like of the apparatus) required for the system. The SRAM 124 is backed up by a battery t,o prevent data from being lost when the power supply is turned off.

Reference numeral 102 denotes a known facsimile modem which has functions required for the ITU recommendation G3 mode, and comprises a DTMF recognition function, an audio CODEC function for audio recording/playback using the DRAM, and the like in addition to V.29, V.21, and V.27ter. Furthermore, the modem 102 has a function of generating a dial signal, and outputting the generated dial signal onto a line. Note that the present invention is not limited to an apparatus for making an outgoing call, which outputs a dial signal onto an analog line, but can be applied to an apparatus for making an outgoing call, which outputs a call command onto a digital line.

Reference numeral 103 denotes a base unit which makes an analog low-power radio communication with a sub telephone unit 105, and is a known unit which controls radio communication in accordance with an instruction from the CPU 101. Reference numeral 104 denotes an analog signal connection switch (cross point SW), which is a known circuit for freely switching connections of analog signals among a handset 106, a microphone 107, a loudspeaker 108, an NCU 109, an audio input terminal of the CPU 101, the modem 102, and the base unit 103 in accordance with the setups from the CPU 101.

Reference numeral 106 denotes a telephone handset of the apparatus main body; 107, a microphone for inputting speech; 108, a loudspeaker; and 109, a known NCU for interfacing with a line.

Reference numeral 110 denotes a known runlength circuit for generating a runlength code from monochrome binary raw image data, and for receiving a runlength code and outputting monochrome binary raw image data. Reference numeral 111 denotes a real time clock (RTC) as a timepiece IC.

Reference numeral 125 denotes a hand scanner unit (HSU) which incorporates a color contact sensor (CS) 112 and a rotary encoder (RC) 116 for measuring the moving distance of the HSU 125 on an original, and is detachably connected to the apparatus main body via a curl cord. Reference numeral 113 denotes an encoder detection circuit for generating moving distance data (rotational speed information of the rotary encoder) from the output signal of the rotary encoder 116, and sending it to the CPU 101.

Reference numeral 114 denotes an image processor. When color raw image data is stored in the DRAM 118 in accordance with an instruction from the CPU 101, the image processor 114 receives an analog RGB signal (line sequential signal: resolution=200 dpi) output from the color contact sensor 112, and converts the received signal into 90-dpi R, G, and B 8-bit (24 bits per pixel) digital data. On the other hand, when a color copy is to be directly produced, the image processor 114 receives an analog RGB signal (line sequential signal: resolution=200 dpi) output from the color contact sensor 112 and converts the received signal into 360-dpi Y, M, C, and K binary digital data. These converted data are supplied to a DMA controller 117.

When color raw image data (90 dpi, RGB) is to be stored in the DRAM 118, the DMA controller 117 transfers the raw color image data to the DRAM 118; when a color copy is to be directly produced, the DMA controller 117 transfers 360-dpi binary Y, M, C, and K data to a recording controller 119.

Furthermore, when monochrome raw image data is to be stored in the DRAM 118, the image processor 114 receives an analog RGB signal (line sequential signal: resolution= 200 dpi) output from the color contact sensor 112, converts the received signal into 200-dpi monochrome binary digital data, and supplies the converted data to the DMA controller 117. When a monochrome copy is to be directly produced, the image processor 114 receives an analog RGB signal (line sequential signal: resolution=200 dpi) output from the color contact sensor 112, converts the received signal into 360-dpi monochrome binary digital data, and supplies the converted data to the DMA controller 117. When monochrome raw image data is to be stored in the DRAM 118, the DMA controller 117 transfers monochrome binary image data to the DRAM 118; when a monochrome copy is to be directly produced, the DMA controller 117 transfers monochrome binary image data to the recording controller 119.

The recording controller 119 converts input image data into a data format that a recording unit 120 can record. The recording unit 120 comprises a known ink-ejection type color printer, and records an image by moving a cartridge which integrates an ink tank and ink ejection portion in the main scanning direction of a recording paper sheet. Whether a color or monochrome cartridge is currently attached can be determined by the CPU 101 depending on the electrical contact pattern between the recording unit 120 and a cartridge.

A resolution conversion circuit 115 is a known circuit for receiving monochrome binary image data and performing resolution conversion. The resolution conversion circuit 115 is used for, e.g., enlarging/reducing a monochrome image, and is also used for matching the resolution of a monochrome image received from a line with that of the recording unit 120.

Figure 3:
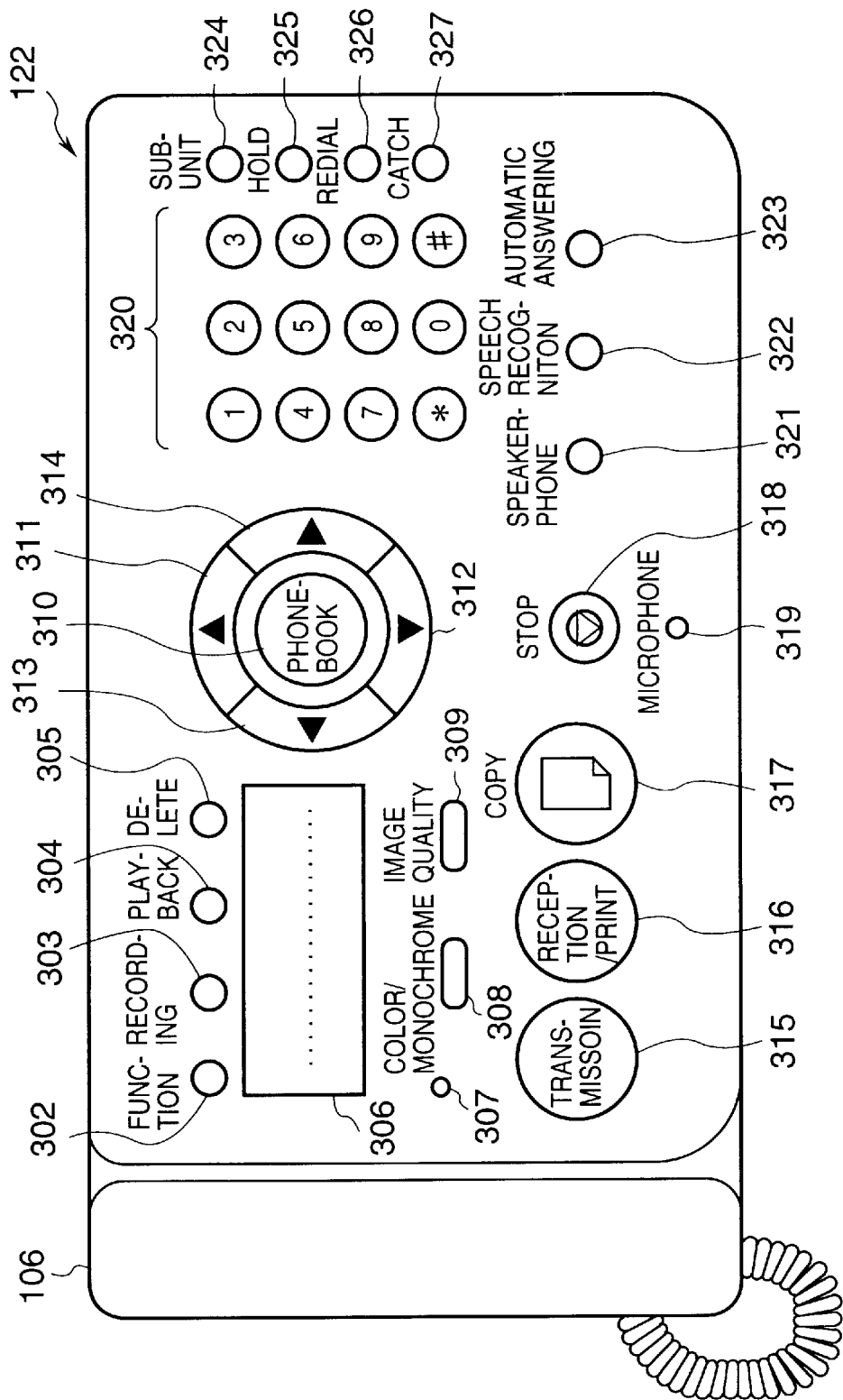
FIG. 3 shows the outer appearance of a control panel 122.

Reference numeral 122 denotes a control panel serving as a console of this apparatus. As shown in FIG. 3, the control panel 122 has various keys, indication lamps, and an LCD display. Also, the microphone 107, loudspeaker 108, and the like are equipped on the control panel 122.

Reference numeral 126 denotes a sensor for detecting attachment/detachment of the hand scanner unit 125 to/from the apparatus main body. The CPU 101 determines a sheet mode for scanning a sheet original, or a hand scan mode for scanning a three-dimensional object such as a book original or the like on the basis of the output from the sensor.

Note that the base unit 103 is not necessary when the sub unit 105 is not connected. Also, when the apparatus has no facsimile communication function, the runlength circuit 110, hand scanner unit 125, encoder detection circuit 113, image processor 114, recording controller 119, recording unit 120, resolution conversion circuit 115, and the like are not necessary. Of course, an apparatus for making an outgoing call, which does not include those components is included in the scope of the present invention.

FIG. 3 shows the outer appearance of the control panel 122. Referring to FIG. 3, reference numeral 106 denotes a handset for the main body mentioned above. Reference numeral 302 denotes a function key used for various registration and setup processes. Reference numeral 303 denotes a recording key used upon recording a voice message or conversation contents in the DRAM 118 as audio data.

Reference numeral 304 denotes a playback key used when the CPU 101 plays back audio data recorded in the DRAM 118 by the audio CODEC of the modem. Reference numeral 305 denotes a delete key used upon deleting various data stored in the memory. Reference numeral 306 denotes an LCD display with a backlight, which can display 16 characters in two lines, and is used for outputting the states of the apparatus and various messages, and for accepting operator inputs.

Reference numeral 307 denotes a color LED which is turned on when a color mode is selected by a color/monochrome key 308. Reference numeral 309 denotes an image quality key for selecting given image quality in a monochrome mode.

Reference numeral 310 denotes a key which serves as both a phonebook key for displaying a phonebook, and a set key for settling registration contents (this key will be referred to as a set key hereinafter for the sake of simplicity). Reference numeral 311 denotes an up cursor key; 312, a down cursor key; 313, a left cursor key; and 314, a right cursor key. These keys are used in operation for display control.

Reference numeral 315 denotes a transmission key for facsimile transmission. Reference numeral 316 denotes a reception/print key used upon facsimile reception and upon printing a received image. Reference numeral 317 denotes a copy key for starting copying. Reference numeral 318 denotes a stop key for interrupting apparatus operation which is underway. Reference numeral 319 denotes an opening for the microphone. Reference numeral 320 denotes a ten key pad. Reference numeral 321 denotes a speakerphone key for setting the apparatus in a state wherein the microphone 107 is activated to output an audio signal onto a line while maintaining line connection, and an audio signal on the line is output to the loudspeaker 108.

Reference numeral 322 denotes a speech recognition key for implementing automatic destination dialing by speech recognition. Reference numeral 323 denotes an automatic answering key for automatically recording the conversation contents of a calling party in the DRAM 118 upon receiving an incoming call. Reference numeral 324 denotes a sub unit key for calling a cordless sub-telephone unit 105 from the apparatus main body to implement an intercommunication. Reference numeral 325 denotes a hold key for outputting a melody to the partner while holding the line busy. Reference numeral 326 denotes a redial key for automatically dialing the telephone number of the previous partner.

In this embodiment, when characters are input on the screen of the LCD 306, for example, characters "KLMNO klmno" are displayed on the LCD by pressing the up or down cursor key 311 or 312. Then, a character selection cursor (_) is moved to a position under, e.g., "M" by pressing the left or right cursor key 313 or 314, and the set key 310 is then pressed to settle a character input.

Reference numeral 327 denotes a catch key used for answering a catch phone call during a given telephone conversation, and then returning to the latter conversation afterwards.

Note that the scope of the present invention includes an apparatus for making an outgoing call, which does not have the recording key 303, playback key 304, color LED 307, image quality key 309, transmission key 315, reception/print key 316, copy key 317, automatic answering key 323, sub unit key 324, catch key 327, and the like.

Figure 2:
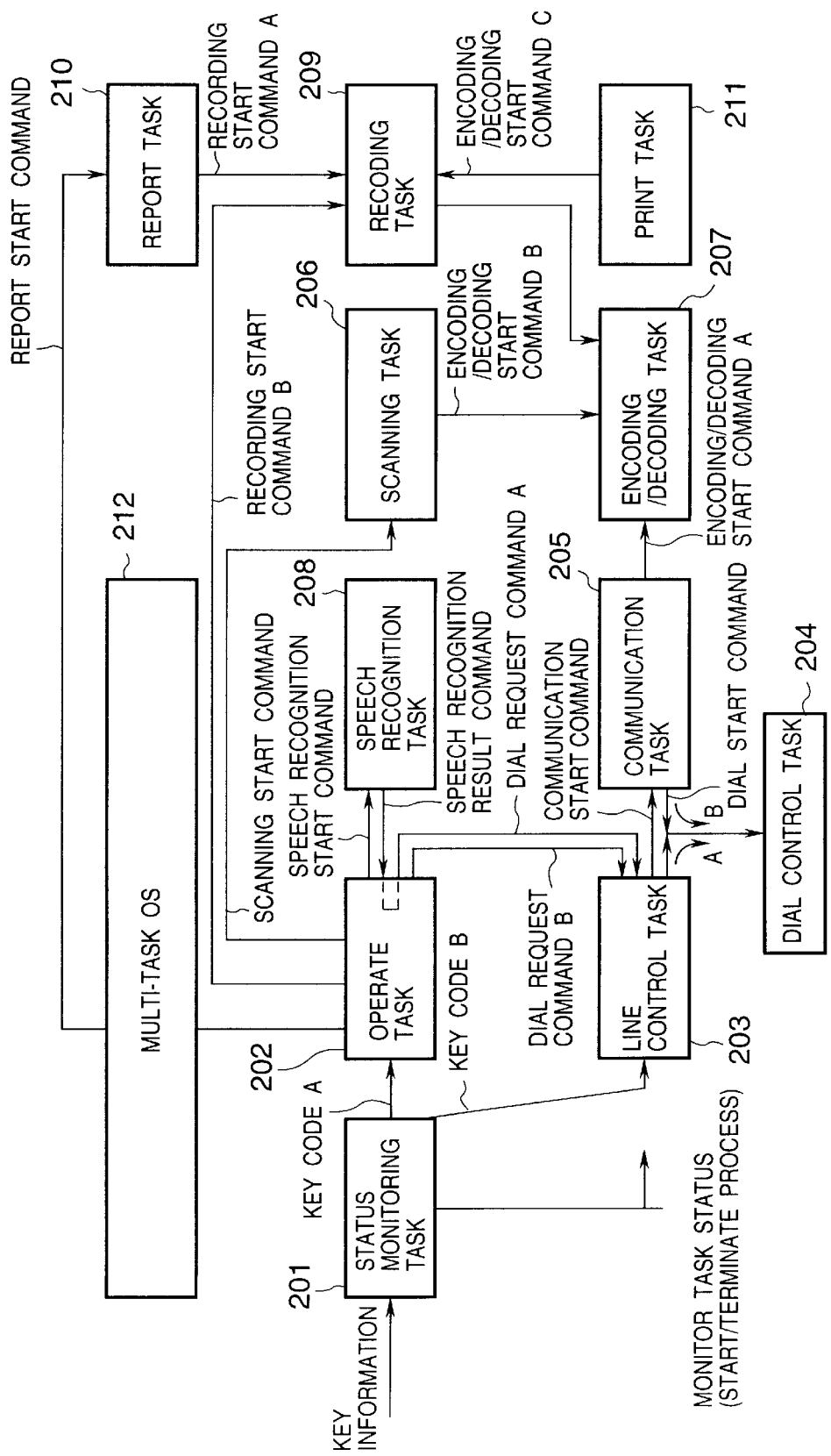
FIG. 2 is a diagram showing the task arrangement of a communication apparatus.

FIG. 2 shows the arrangement of tasks in the apparatus for making an outgoing call. Software of this apparatus is given an environment that can parallelly implement the individual tasks by a multi-task operating system (OS) 212. The respective tasks will be explained below.

Reference numeral 201 denotes a status monitoring task having a function of monitoring events that occur in the apparatus, and informing a relevant task of event information upon detecting an event that requires a change in apparatus status. For example, upon detecting key information input by the control panel 122, the task 201 informs an operate task 202 and line control task 203 of required key information, thus activating functions of the apparatus.

Reference numeral 202 denotes an operate task, which determines an operation mode upon receiving key code A information from the status monitoring task 201, issues a start command to a given task that implements a function, and controls the display function of the control panel 122 on the basis of the key code A information.

Reference numeral 203 denotes a line control task which executes a sequence for controlling the NCU 109 to accept an incoming call from a line, seize a line to output a dial signal in response to a dial request command from the operate task 202, and terminate communication by disconnecting a line. Also, the line control task 203 detects depression of the transmission key 315 or reception/print key 316 from key code B information output from the status monitoring task 201 in the line connection state, automatically determines if the calling party is a telephone or facsimile by analyzing a signal on the line, and issues a communication start command for a facsimile communication to a communication task 205 if the calling party is a facsimile.

Reference numeral 204 denotes a dial control task having a function of outputting various dial signals to a switching fabric in response to a dial start command from the line control task 203 or communication task 205. Note that the dial control task 204 controls the modem 102 to output a dial signal onto the line. Reference numeral 205 denotes a communication task which implements various facsimile communications (implementation of a communication procedure and image data transmission) in response to a communication start command output from the line control task 203.

Reference numeral 206 denotes a scanning task which controls the hand scanner unit 125 and image processor 114 to scan an original image in response to a scanning start command from the operate task 202.

Reference numeral 207 denotes an encoding/decoding task which encodes/decodes image data by software in response to various encoding/decoding start commands from the communication task 205, the scanning task 206, and a recording task 209. For this reason, in the apparatus of this embodiment, the hardware cost for encoding/decoding is greatly reduced. However, software implementation requires longer processing time than hardware implementation. Note that known MH coding is applied to a monochrome image, and a known coding scheme that assigns Huffman codes to RGB multivalued DPCM (a scheme for calculating the difference between neighboring pixels using 8-bit R, G, and B values) is applied to a color image.

Reference numeral 208 denotes a speech recognition task, which is software including a known speech recognition algorithm for analyzing speech uttered by the user and input from the handset 106, comparing it with one or a plurality of speech data registered in advance, and giving information of matched speech data. The speech recognition task 208 is activated in response to a speech recognition start command from the operate task 202. The speech recognition task 208 ends by itself.

The speech recognition task 208 sends back speech training (speech registration) and speech recognition results to the operate task 202 as speech recognition result commands.

(1) Speech Registration

Data to be compared and analyzed for speech recognition is generation on a speech registration memory in the SRAM 124. Speech input via the handset 106, microphone 107, or NCU 109, or speech input from the sub unit 105 via the line or the base unit 103 is input to the CPU 101 as audio data via the cross point SW 104. The CPU 101 makes various arithmetic operations of the audio data to generate data for speech recognition, and registers it in the speech registration memory in the SRAM 124. For example, the CPU 101 extracts features of the audio data, converts them into digital data after extraction, and registers the digital data. Then, the CPU 101 sends back a speech registration result (OK/NG) to the operate task 202 as a speech recognition result command.

(2) Speech Recognition

Speech input via the handset 106, microphone 107, or NCU 109, or speech input from the sub unit 105 via the line or the base unit 103 is input to the CPU 101 as audio data via the cross point SW 104. The CPU 101 makes various arithmetic operations of the audio data, compares the obtained data with those registered in the speech registration memory in the SRAM 124, selects the closest data, and sends back the selection result to the operate task 202 as a speech recognition result command.

Reference numeral 209 denotes a recording task having a function of making the recording unit 120 print requested image data in response to a recording start command from a report task 210 or print task 211. Reference numeral 210 denotes a report task which is software for generating various kinds of reports. For example, the report task 210 generates a communication management report that records a communication history, and a function setup list of registration information and the like in the SRAM 124 using character data, maps them into image data, and issues a recording request to the recording task 209.

Reference numeral 211 denotes a print task having a monitoring function of always checking if image data to be automatically recorded is stored in the DRAM 118, and issuing a recording start command to the recording task 209 upon detecting image data to be recorded.

Registration and operation of the phonebook function in the apparatus for making an outgoing call will be explained below.

Phonebook Registration (New Registration)

A maximum of 100 phonebook data can be registered. A display screen of phonebook registration is set on the LCD 306 on the control panel 122 by operating a function menu using the up or down cursor key 311 and 312. FIG. 4 shows the display screen of phonebook registration. On the screen of the LCD 306, 2 (lines)×16 (digits) characters can be input and displayed. The first line in FIG. 4 displays "PHONEBOOK FREE SPACE FOR 70 DATA AVAILABLE", and the second line displays "PRESS SET KEY TO START REGISTRATION".

FIGS. 5A to 5C show the input screen upon registering phonebook data. When the user has pressed the set key 310 on the screen shown in FIG. 4, a screen shown in FIG. 5A is displayed, and a character can be input at the position of an edit cursor (indicated by reverse display (■) in FIG. 5A). The second line displays "ABCDE abcde→END" to indicate the character input method. When "YAMASHITA" and "TEL=03 1234 5963" are respectively input to the first and second lines, as shown in FIG. 5B, the first line displays "YAMASHITA" and the second line displays "REGISTERED". After one data is registered in the phonebook, displayed on the LCD 306 switches to the next screen shown in FIGS. 6A and 6B.

FIGS. 6A and 6B show the registration screen of speech data. A maximum of 15 speech data can be registered. The first line on the screen in FIG. 6A displays "REGISTER SPEECH DATA?" and the second line displays "YES→NO REST 15". Note that "REST 15" indicates the remaining number of data that can be registered. When speech data is registered, the user selects "YES". When "YES" is selected and speech data is registered, the screen shown in FIG. 6B is displayed. The first line of the screen displays "PROCEED TO REGISTER?" and the second line displays "YES→NO". By selecting "YES", the user inputs the next destination. By selecting "NO", the apparatus returns to a standby (waiting) state.

Phonebook Registration (Correction of Registered Contents)

FIGS. 7A to 7C show the display screen upon correcting the registered contents of the phonebook. When the user has pressed the phonebook key 310 in the standby state, and has selected a telephone number corresponding to the registered contents to be corrected by operating the up or down cursor key 311 or 312, the first line in FIG. 7A displays "→KIMURA TAKUYA", and the second line displays "KIMUPA WATARU". When speech data for speech recognition is registered, a mark "V" is displayed at the right end.

When the user has pressed redial key 326 in the state shown in FIG. 7A, the display screen switches to that shown in FIG. 7B. The first line on the screen displays "■IMURA TAKUYA", and the second line displays "ABCDEF abcdef→END" to indicate the character input method. A character can be input at the position indicated by the cursor (edit cursor ■ or character selection cursor _).

FIG. 7C shows selection/movement of a candidate character. The first line in FIG. 7C displays "T_MURA TAKUYA", and the second line displays "PQRST pqrst→END".

Upon moving the cursor to select a candidate character using one of the up, down, left, and right keys 311, 312, 313, and 314, the edit cursor in the first line is moved by a "*" or "#" key. An abbreviation is corrected by selecting "END" by moving the cursor using the left or right cursor key 313 or 314. The first line in FIG. 8A displays "TAMURA TAKUYA" and the second line displays "TEL=04 0123 0123".

When the number need not be changed, the set key 310 is pressed. On the other hand, when the number is to be changed, the dial number is re-input by pressing the delete key 305, as shown in FIG. 8B.

When speech data has been set by registration before the change, whether or not speech data is changed is selected. FIGS. 9A and 9B show the registration screen of speech data. The first line in FIG. 9A displays "REGISTER SPEECH DATA?" and the second line displays "→YES NO". If "YES" is selected, whether or not new speech data is registered in place of old data is set. The first line in FIG. 9B displays "REPLACE SPEECH DATA?", and the second line displays "→YES NO". In this case, speech data is registered by the same operation method as that of normal registration of speech data.

Phonebook Registration (Delete)

The user presses the phonebook key 310 and selects the telephone number to be deleted by operating the up or down cursor key 311 or 312. FIGS. 10A to 10D show the screen upon deleting phonebook data. The first line in FIG. 10A displays "→KIMURA TAKUYA", and the second line displays "KIMURA WATARU". Upon depressing the delete key 305 in this state, display on the LCD 306 switches to the screen shown in FIG. 10B. In FIG. 10B, the first line displays "KIMURA TAKUYA", and the second line displays "PRESS SET KEY TO DELETE".

Upon depression of the set key 310, display on the LCD 306 switches to the screen shown in FIG. 10C. In FIG. 10C, the first line displays "KIMURA TAKUYA", and the second line displays "DELETED". After deletion, the phonebook is displayed, as shown in FIG. 10D. The first line displays "→KIMURA WATARU", and the second line displays "YANAGIDA". Note that the arrow "→" indicates a candidate next to the deleted data. At this time, if speech data has been registered in the deleted data, it is deleted together.

Phonebook Search

FIGS. 11A to 11C show the screen upon searching the phonebook. Upon depression of the phonebook key 310 in the standby state or after the line is seized, the screen shown in FIG. 11A is displayed. The first line displays "→AIKAWA", and the second line displays "INOUE V". That is, registered abbreviations sorted in the alphabetical order are displayed. Upon depression of the cursor key 312, display switches to the screen shown in FIG. 11B. The first line displays "AIKAWA", and the second line displays "→INOUE V".

When the up cursor key 311 is further pressed, display switches to the screen shown in FIG. 11C. The first line displays "→INOUE V", and the second line displays "ISHIKAWA". When the user abbreviation is selected and the right cursor key 314 is pressed, detailed display (number display) is made.

FIGS. 12A and 12B show the screen upon making number display (detailed display). The first line in FIG. 12A displays "→INOUE V", and the second line displays "ISHIKAWA". When the right cursor key 314 is displayed in this state, display switches to the screen in FIG. 12B. The first line displays "→INOUE V", and the second line displays "TEL= 0474 12 1234". When the up or down cursor key 311 or 312 is pressed in this state, the same operation as that executed upon depression of the up or down cursor key 311 or 312 from the state immediately before detailed display is made. Upon depression of the stop key 318, the apparatus returns to the standby state; when the line is being seized, "TEL=" is displayed again.

FIGS. 13A to 13C show the screen when a user abbreviation is selected and the set key 310 is pressed. The first line in FIG. 13A displays "→INOUE V", and the second line displays "ISHIKAWA". When the set key 310 is pressed in this state, if the line is being seized, display switches to the screen shown in FIG. 13B upon depression of the set key 310, and a call is placed to the displayed dial number. The first line displays "INOUE", and the second line displays "0474 12 1234".

If the line is not seized, depression of the set key 310 is ignored. In this case, "→INOUE V" and "ISHIKAWA" are kept displayed on the first and second lines, as shown in FIG. 13C.

[Registration of Speech Data]

After the telephone number is registered upon registering the phonebook, the next screen is displayed. FIGS. 14A to 14D, FIGS. 15A to 15C, and FIGS. 16A to 16C show the screen upon registering speech data. The first line in FIG. 14A displays "REGISTER SPEECH DATA" and the second line displays "→YES NO". When "YES" is selected on this screen, the speech registration screen switches to that shown in FIG. 14B. In FIG. 14B, the first line displays "PICK UP HANDSET".

When the user picks up the handset, the display screen switches to that shown in FIG. 14C. The first line in FIG. 14C displays "AFTER BEEP TONE", and the second line displays "INPUT YOUR SPEECH". After the "beep" tone, the display screen switches to that shown in FIG. 14D. The first line in FIG. 14D displays "INPUT YOUR SPEECH".

The user utters the name to be registered to the handset. Upon detecting speech, the screen shown in FIG. 15A is displayed. The first line in FIG. 15A displays "SPEECH INPUT IN PROGRESS". Speech is successively input three times per data. Then, the first line in FIG. 15B displays "ANALYSIS IN PROGRESS".

Since speech data is registered three times per data, the screen that prompts the user to make two more speech registrations in FIG. 15C is displayed. That is, the first line in FIG. 15C displays "ANALYSIS SUCCESSFUL" and the second line displays "2 MORE TIMES".

Speech is registered in the second and third registrations in the same manner as in the first registration. When speech is successfully registered three times, registration of speech data ends by displaying the screen shown in FIGS. 16A to 16D. After the first line in FIG. 16A displays "SPEECH REGISTRATION IN PROGRESS", the screen switches, and the first line in FIG. 16B displays "REPLACE HANDSET". After the user replaces the handset cradle, the screen shown in FIG. 16C is displayed. The first line in FIG. 16C displays "SPEECH DATA", and the second line displays "REGISTERED".

After one speech data is registered, whether or not the next registration is made is selected on the screen shown in FIG. 16D. The first line in FIG. 16D displays "PROCEED TO REGISTER", and the second line displays "→YES NO". If "YES" is selected, the display screen returns to that of abbreviation registration upon registering the phonebook.

[Operation for Making Call By Speech Recognition]

FIGS. 17A to 17D and FIGS. 18A and 18B show the screen upon making a call by speech recognition. When the user places a call by picking up the handset 106 after he or she presses the speech recognition key 322, the screen shown in FIG. 17A is displayed upon depression of the speech recognition key 322. The first line in FIG. 17A displays "PICK UP HANDSET". When the user picks up the handset, the first line in FIG. 17B displays "AFTER BEEP TONE", and the second line displays "INPUT YOUR SPEECH".

The "beep" tone is produced, and display switches to the screen shown in FIG. 17C. The first line in FIG. 17C displays "INPUT YOUR SPEECH". When the user utters a registered name to the handset while this screen is displayed, display switches to the screen shown in FIG. 17D. The first line in FIG. 17D displays "SPEECH INPUT IN PROGRESS".

When the uttered name matches a registered one, the registered name and telephone number are displayed, as shown in FIG. 18A. If speech data "KIMURATAKUYA" is registered, and the uttered name matches registered speech data "KIMURATAKUYA", the first line in FIG. 18A displays "KIMURA TAKUYA", and the second line displays "TEL=0123456789". Note that "KIMURA TAKUYA" is character data registered by key input.

When "AUTO" has been selected in "OPERATION UPON SPEECH RECOGNITION" in the setups of the apparatus, a call is placed. When "WAIT FOR SET KEY" is set, the screen shown in FIG. 18B is displayed, and switches to that shown in FIG. 18A upon depression of the set key 310, thus making a call. "AUTO" or "WAIT FOR SET KEY" is registered in the SRAM 124 by key input in the setting mode which is activated upon depression of the function key 302.

Operation for Making Call by Pressing Speech Recognition Key After Handset is Picked Up FIGS. 19A to 19D and FIGS. 20A and 20B show the screen upon making a call by pressing the speech recognition key after the handset is picked up. When the user picks up the handset, display shown in FIG. 19A is made, and the first line displays "TEL=". Upon depression of the speech recognition key 322, display switches to the screen shown in FIG. 19B. The first line in FIG. 19B displays "AFTER BEEP TONE", and the second line displays "INPUT YOUR SPEECH".

The "beep" tone is produced, and display switches to the screen shown in FIG. 19C. The first line in FIG. 19C displays "INPUT YOUR SPEECH". When the user utters a registered name to the handset while this screen is displayed, display switches to the screen shown in FIG. 19D. The first line in FIG. 19D displays "SPEECH INPUT IN PROGRESS". When the uttered name matches a registered one, the registered name and telephone number are displayed, as shown in FIG. 20A. The first line in FIG. 20A displays "KIMURA TAKUYA", and the second line displays "TEL=0123456789".

When "AUTO" has been selected in "OPERATION UPON SPEECH RECOGNITION" in the setups, a call is placed. When "WAIT FOR SET KEY" is set, the screen shown in FIG. 20B is displayed, and switches to that shown in FIG. 20A upon depression of the set key 310, thus making a call.

Deletion of Speech Data

FIGS. 21A to 21C show the screen upon deleting speech data. The abbreviation, speech data of which is to be deleted, is displayed on the phonebook. When the user presses the redial key 326 to settle the name and telephone number, display switches to the setting screen of speech data shown in FIG. 21A. The first line in FIG. 21A displays "REGISTER SPEECH DATA", and the second line displays "→YES NO".

When "NO" is selected, display switches to the screen shown in FIG. 21B. The first line in FIG. 21B displays "SPEECH DATA", and the second line displays "DELETE?→YES NO". When "YES" is selected, the speech data is deleted, and display shown in FIG. 21C is made. The first line in FIG. 21C displays "SPEECH DATA", and the second line displays "DELETED". After that, display returns to that of the phonebook, and the process ends.

Replacement of Speech Data

Figure 22:
FIG. 22 shows a screen upon replacing speech data.

FIG. 22 shows the screen upon replacing speech data. The user displays a given abbreviation on the phonebook, and presses the redial key 326 to settle the name and telephone number. After that, when the user selects "YES" on the selection screen ("YES/NO") of speech data registration, the screen shown in FIG. 22 is displayed, and speech data can be replaced. The first line in FIG. 22 displays "REPLACE SPEECH DATA?", and the second line displays "→YES NO". Speech data can be replaced by the same operation as that upon registering speech data.

Figure 23:
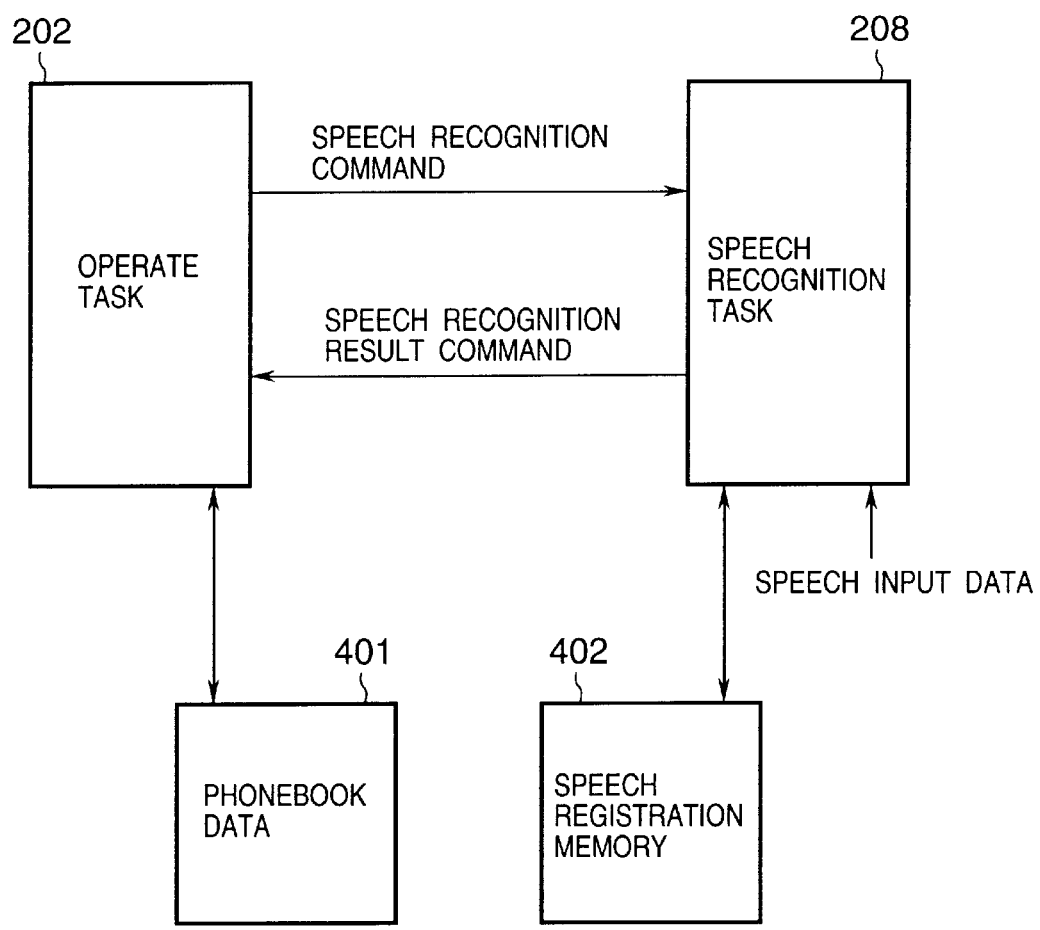
FIG. 23 is a diagram showing an outline of a speech recognition process.

Operation upon making destination dialing by speech recognition will be described in detail below. FIG. 23 shows an outline of the speech recognition process. When speech data is registered in the phonebook or speech recognition is executed by the speech recognition key 322, the operate task 202 issues a speech recognition start command to the speech recognition task 208 to make it start a speech registration process or speech recognition process.

The speech recognition task 208 samples analog audio data input via the handset 106 or microphone 107 using the internal A/D converter of the CPU to convert it into digital data, receives the digital data as speech input data, and makes an arithmetic operation of the speech input data. In this arithmetic operation, the task 208 refers to a speech registration memory 402 included in the SRAM 124. Upon completion of the arithmetic operation, the speech recognition task 208 sends back a speech recognition result command to the operate task 202. The operate task 202 refers to phonebook data 401 included in the SRAM 124, and displays the speech recognition result on the LCD 306.

FIG. 24 shows the contents of a speech recognition start command. The command type includes command 0 to command 6. Command 0 is used to delete given designated speech registration data from the speech registration memory in the SRAM 124. Commands 1 and 2 are used to request a speech registration process. Commands 3 and 4 are used to request a speech recognition process. Commands 5 and 6 are also used to request a speech recognition process. However, upon receiving these commands, the speech recognition task 208 recognizes after excluding speech registration data with the registration number designated by the command from data to be compared. On the other hand, commands 2, 4, and 6 request a reason code when the result is NG.

FIG. 25 shows the contents of the speech recognition result command. The command type includes command 1 to command 4. Commands 1 and 2 are used to notify the speech registration result. Commands 3 and 4 are used to notify the speech recognition result.

When a switch item "display reason code", which is registered as a software switch in the SRAM 124, is ON, and when the speech registration or recognition process results in NG, a "reason code" indicating the reason for NG is reflected in the speech recognition result command (commands 2 and 4). FIG. 26 shows the contents of the reason code. Based on these reason codes, the reason for NG is displayed on the control panel 122 to provide an important guidance upon inspection in the manufacture or upon use by the user.

Reason code R01 indicates that there is no speech registration data to be compared. Reason code R02 indicates that there is no effective speech input data due to silence or noise. Reason code R03 indicates that there is no matching data. Reason code R04 indicates that no more data can be registered due to overflow of the speech registration memory in the SRAM 124. Reason code R05 indicates that the speech input time has exceeded 3 sec. Reason code R06 indicates that the input tone volume is too high due to too loud a voice or a position too close to the microphone. Reason code R07 indicates that the user has interrupted the process by turning on the stop key 318 or replacing the handset 106.

Figure 27:
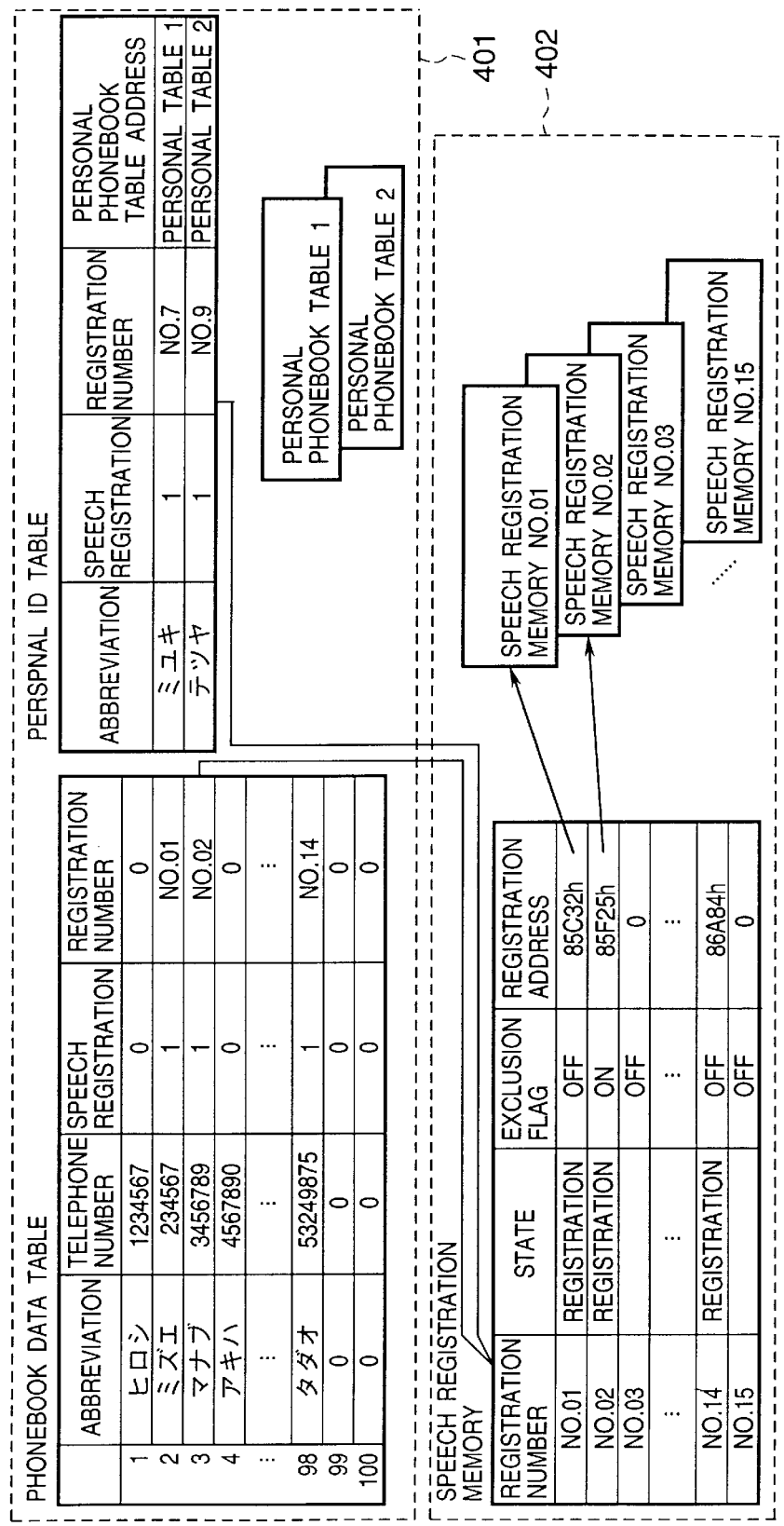
FIG. 27 is a view showing the relationship between the phonebook data managed by an operate task and a speech registration memory managed by a speech recognition task 208, and the data contents of the individual tables.

FIG. 27 shows the relationship between the phonebook data 401 managed by the operate task 202 and the speech registration memory 402 managed by the speech recognition task 208, and the contents of the individual data. In FIG. 27, the phonebook data 401 managed by the operate task 202 is bounded by the upper dotted line. The phonebook data 401 is roughly classified into two kinds of tables. One table is a phonebook data table common to users. The phonebook data table is constructed by a plurality of blocks each consisting of destination data such as an abbreviation, destination number (telephone number), speech registration flag (speech registration), speech registration number (registration number), and the like.

When the phonebook data table is used, the user presses the speech recognition key 322 and utters the abbreviation of a destination. By recognizing the input speech, destination dialing using the common phonebook is implemented.

The other table of the phonebook data 401 is a personal phonebook table. The structure of this personal phonebook table is the same as that of the phonebook data table, but this table is managed by a personal ID table. The personal ID table is constructed by a plurality of blocks each consisting of an abbreviation, speech registration flag (speech registration), speech registration number (registration number), and personal phonebook table address.

When the personal phonebook table is used, the user presses the speech recognition key 322 and utters a personal ID ("MIYUKI", "TETSUYA" in an example shown in FIG. 27). By recognizing that input speech, a personal phonebook table is designated by the personal ID table. The user subsequently utters the abbreviation of a destination, and by recognizing the input speech, destination dialing using the personal phonebook is implemented.

The structure of the speech registration memory 402 managed by the speech recognition task 208 on the SRAM 124 is bounded by the lower dotted line in FIG. 27. The speech registration memory is configured by a table which consists of a total of 15 blocks each including a registration number, state, exclusion flag, and registration address data. The registration number corresponds to the registration address, which is the physical address of a RAM area where digital encoded speech data is stored. The state indicates the registered or free state.

All exclusion flags are reset to OFF upon receiving one of commands 0, 1, 2, 3, and 4 shown in FIG. 24. Likewise, upon receiving either command 5 or 6, the exclusion flag of the registration number designated by the received command is set to ON. When the exclusion flag is ON, the corresponding data is excluded from data to be compared in the speech recognition process. The registration number in the speech registration memory has one-to-one correspondence with the registration number described in the aforementioned phonebook data table, personal ID table, and personal phonebook data.

Figure 28:
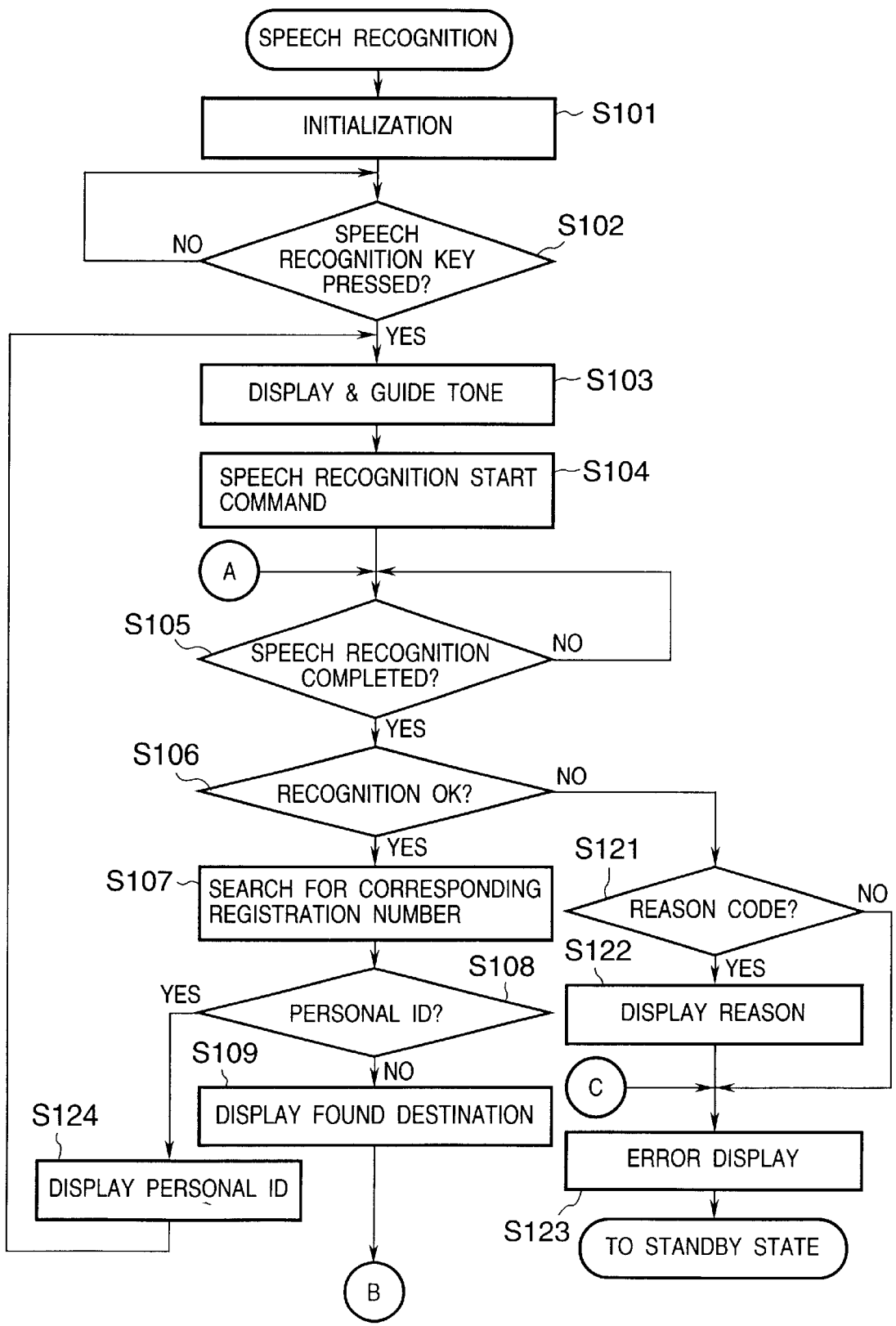
FIG. 28 is a flow chart showing the speech recognition procedure.
Figure 29:
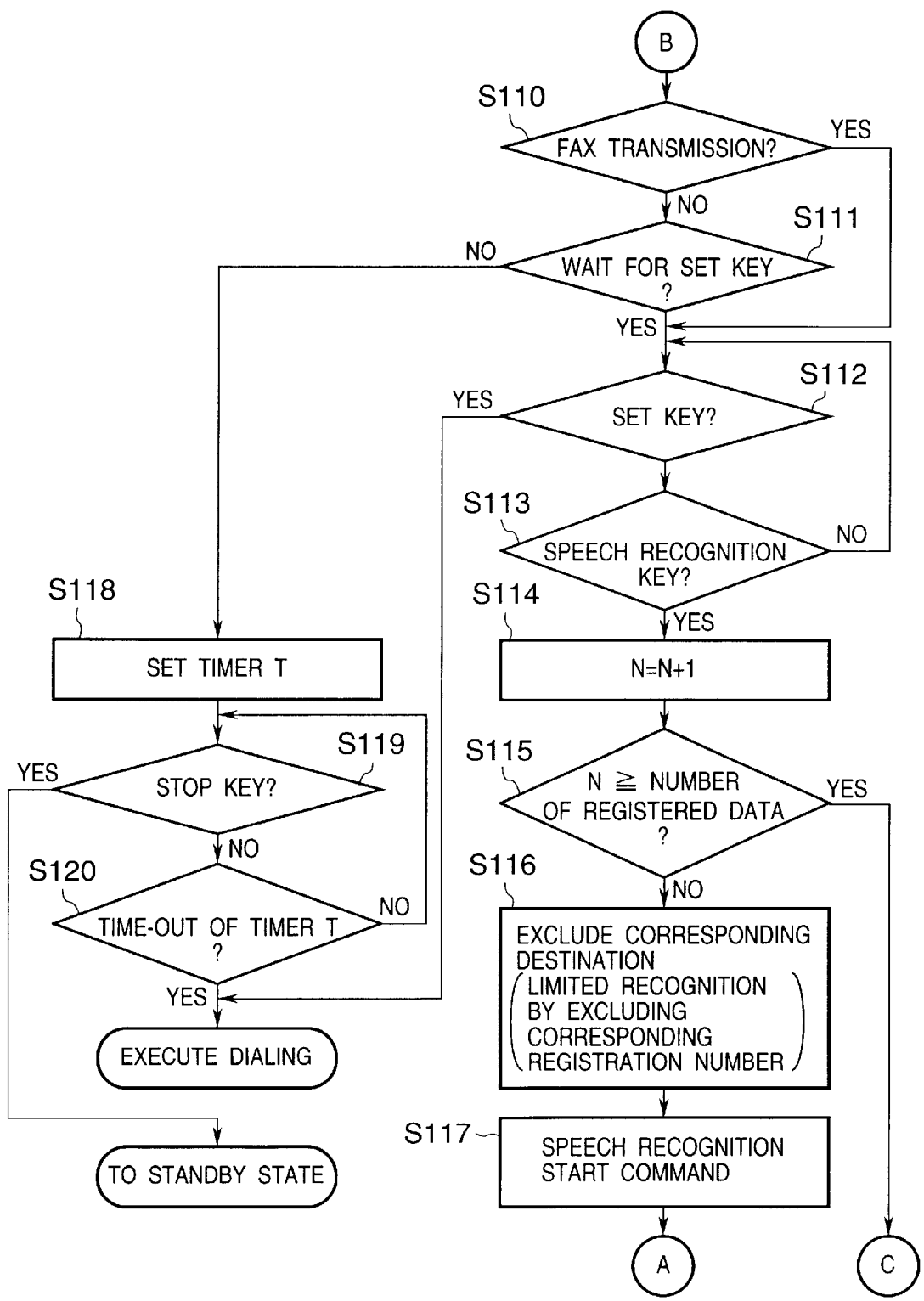
FIG. 29 is a flow chart showing the speech a recognition procedure.

FIGS. 28 and 29 are flow charts showing the speech recognition procedure. This processing program is stored in the ROM 121, and is executed by the CPU 101 implemented by a microcomputer.

A variable N is initialized to a value "0" (step S101). The apparatus is in the standby state, and waits for off-hook and depression of the speech recognition key 322 (step S102). Upon detection of off-hook and depression of the speech recognition key 322, visual messages and guide tone are output (step S103).

As has been described previously with reference to FIGS. 17A to 17D or FIGS. 19A to 19D, the messages shown in FIGS. 17A and 17B or FIGS. 19A and 19B are displayed in correspondence with the hook state and depression of the speech recognition key 322. A "beep" guide tone is produced from the loudspeaker 108, and the message shown in FIG. 17C or 19C is displayed.

Note that the process in step S101 is executed, and the control waits for either off-hook or depression of the speech recognition key 322 in step S102 in the standby state of the apparatus of the present invention. In the standby state, the current time is displayed. Upon detection of off-hook and depression of the speech recognition key 322, the speech recognition mode is activated.

The operate task 202 issues a speech recognition command (command 3 or 4) to the speech recognition task 208 (step S104), thus activating the speech recognition process by the speech recognition task 208. At this time, the speech recognition task 208 resets all exclusion flags of speech registration data to OFF. Note that whether speech recognition start command 3 or 4 is issued is registered in the SRAM 124.

The user utters the abbreviation of a given destination, and waits for completion of the speech recognition process (step S105). Upon completion of the speech recognition process, the speech recognition task 208 sends back a speech recognition result command to the operate task 202. If speech recognition start command 3 is issued in step S104, speech recognition result command 3 is sent back; if speech recognition start command 4 is issued in step S104, speech recognition result command 4 is sent back. When the user utters the abbreviation of the destination of his or her choice, the message shown in FIG. 17D is displayed until speech recognition is completed in step S105.

It is then checked if the speech recognition result is OK or NG (step S106). If the result is NG, whether or not a reason code is appended is determined based on the received speech recognition result command (step S121). If a reason code is appended, the reason for NG corresponding to the reason code is displayed (step S122), and an error message is subsequently displayed (step S123), thus setting the apparatus in the standby state. On the other hand, if a reason code is not appended, an error message is displayed, and the apparatus is set in the standby state.

On the other hand, if it is determined in step S106 that the speech recognition result is OK, the phonebook data table is searched based on the registration number notified by the speech recognition result command to find out a corresponding item (step S107). It is checked if the found item is "personal ID" (step S108). If the found item is a personal ID, that personal ID (abbreviation, e.g., "MIYUKI" or "TETSUYA") is displayed on the control panel 122 (step S124), and the flow returns to step S103 to execute the speech recognition process again to search the personal phonebook table for the designated destination.

On the other hand, if the corresponding item is found in the common phonebook data table or personal phonebook table in step S107, the abbreviation of the destination is displayed on the control panel 122 to inform the user of the speech recognition result (step S109). That is, when destination dialing is implemented using the personal phonebook table, the user utters two words, i.e., the personal ID and the abbreviation of the destination. In this manner, upon completion of speech recognition, the apparatus of this embodiment enters a mode for displaying that speech recognition result. The speech recognition result is displayed, as shown in, e.g., FIG. 18A.

It is then checked if facsimile transmission operation is done (step S110). If facsimile transmission operation is done, the flow advances to step S112; otherwise, it is checked if a switch item "wait for set key of speech data" on the SRAM 124 is set to wait for depression of the set key (step S111).

When the apparatus has no facsimile transmission function, step S110 is omitted, and step S111 is executed after step S109.

If the switch item is set to wait for depression of the set key or if facsimile transmission operation is done, it is checked if the set key 310 has been pressed (step S112). If the set key has been pressed, a call is placed to the found dial number. When the switch item is set to wait for depression of the set key, the message shown in FIG. 18B is displayed after the message shown in FIG. 18A. Alternatively, when the switch item is set to wait for depression of the set key, the message shown in FIG. 18B may be displayed without displaying the message shown in FIG. 18A after FIG. 17D. On the other hand, if it is determined in step S111 that the switch item is not set to wait for depression of the set key but is set to be "auto", a call is placed to the found dial number without waiting for depression of the set key 310. When the switch item is not set to wait for depression of the set key, the message shown in FIG. 18A is displayed but the message shown in FIG. 18B is not displayed.

When facsimile transmission operation is done in this manner, depression of the set key 310 is required to avoid possibility of transmission by a recognition error.

When dialing is to be started without depression of the set key 310 during operation for talking to someone on the phone, since the user requires some time to confirm the displayed destination, start of dialing is delayed by time T measured by a timer. That is, time T is set in the internal timer of the RTC 111 (step S118), and it is then checked if the stop key 318 has been pressed (step S119). If the stop key 318 has not been pressed, it is checked if the timer has exceeded time T (step S120). If the timer has exceeded time T, the flow returns to step S119. The message shown in FIG. 18A is displayed until the timer exceeds time T. On the other hand, if it is determined in step S119 that the stop key 318 has been pressed, the standby state is set.

If the speech recognition key 310 is pressed in place of the stop key 318 in step S119, the flow may return to step S105.

Note that time T to be set in the timer is registered in advance in the SRAM 124, and can be changed by user operation.

On the other hand, in the state wherein the control waits for depression of the set key 310 in step S112 to execute dialing, when the user finds a destination recognition error by checking the abbreviation displayed on the control panel 122, as shown in FIG. 18B, he or she may press the speech recognition key 322 to execute the speech recognition process again. Hence, it is checked if the speech recognition key 322 has been pressed (step S113). If the speech recognition key 322 has not been pressed, the flow returns to step S112; otherwise, the variable N is incremented by 1 (step S114).

It is checked if the variable N is equal to or larger than the number of registered data (step S115). If the variable N is equal to or larger than the number of registered data, the flow advances to step S123 to display an error message. Note that the number of registered data is the number of speech data registered in the speech registration memory. More specifically, the number of registered data indicates the number of speech data whose states indicate "registered" of registration numbers No. 01 to No. 15 in the speech registration memory shown in FIG. 27. A maximum of 15 speech data can be registered. In this manner, the variable N is used to limit the number of times of repetition of the speech recognition process. If the number of registered data is 10, the speech recognition process can be repeated up to 10 times by depressing the speech recognition key.

On the other hand, if the variable N is less than the number of registered data, the operate task issues a speech recognition command (command 5 or 6) of limited recognition (step S117) to request the speech recognition task 208 to execute speech recognition again upon excluding the currently displayed destination (step S116). If speech recognition start command 3 is issued in step S104, speech recognition command 5 is issued; if speech recognition start command 4 is issued in step S104, speech recognition command 6 is issued. Also, the message shown in FIG. 17B is displayed, a "beep" guide tone is output, and the message shown in FIG. 17C is then displayed. After that, the flow returns to step S105. Then, as described above, the message shown in FIG. 17D is displayed until the user utters the abbreviation of a given destination and the speech recognition process is completed. If the speech recognition process is redone in step S113, neither the message shown in FIG. 17A or 18A nor the current time (standby state) are displayed.

The speech recognition task 208 sets the exclusion flag of the speech registration data to be excluded to be ON, and executes the speech recognition process again. As a result, if a recognition error has occurred again and a wrong abbreviation is displayed, the speech recognition key 322 may be pressed again without pressing the set key 310. A new speech recognition process is executed upon excluding the previously and currently recognized destinations.

As described above, in the apparatus for making an outgoing call of this embodiment, the abbreviation of a destination specified by the speech recognition process is displayed, and the control waits for depression of the set key. Upon detection of input of the set key 310, a call is originated to the specified destination. On the other hand, upon detection of input of the speech recognition key 322, the speech recognition process is redone without resetting the apparatus to the standby state. Hence, when a recognition error has occurred in the speech recognition process, the operator need not stop the apparatus to temporarily reset it to the standby state so as to redo operations from the beginning, but can immediately retry speech recognition, thus greatly improving operability.

In the above embodiment, a destination recognized by the speech recognition process is displayed, but may be output as a voice message in place of or together with display.

In the above embodiment, dialing is started upon depression of the set key 310 by the operator, and a speech recognition start command is re-issued upon depression of the speech recognition key 322 by the operator. In place of such key input, such operations may be done when the operator inputs predetermined speech (e.g., "retry").

Furthermore, in the above embodiment, the present invention is applied to a facsimile apparatus, but may be applied to an information processing apparatus such as a portable information terminal, personal computer, and the like.

Note that the present invention can be applied to either a system constituted by a plurality of devices, or an apparatus consisting of a single equipment. The present invention can also be applied to a case wherein the invention is achieved by supplying a program to the system or apparatus.

Figure 30:
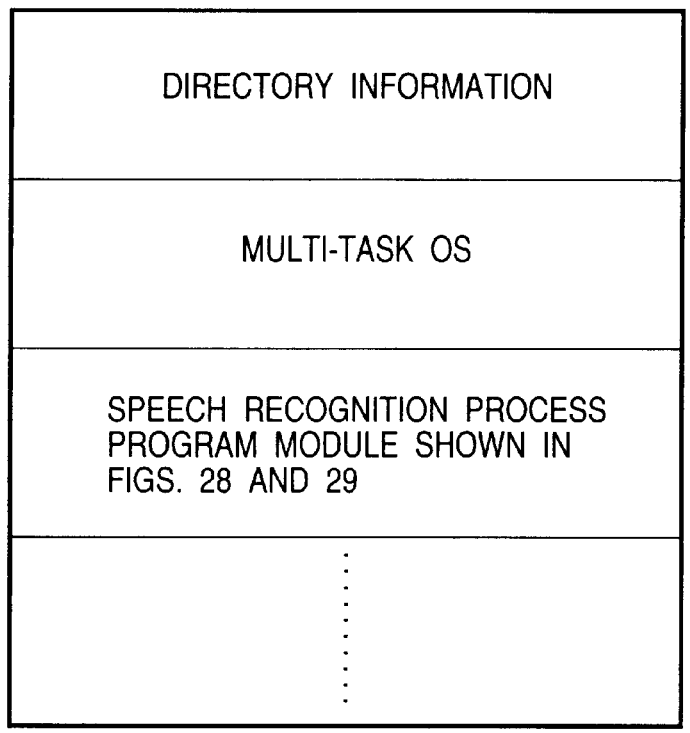
FIG. 30 shows a memory map of a ROM 121 serving as a storage medium.

FIG. 30 shows the memory map of the ROM 121 as a storage medium. The ROM 121 stores a speech recognition process program module shown in the flow charts in FIGS. 28 and 29, and the like, which are executed under the control of a multi-task OS.

The storage medium is not limited to the ROM and, for example, a floppy disk, hard disk, optical disk, magneto-optical disk, CD-ROM, CD-R, magnetic tape, nonvolatile memory card, and the like may be used.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

As many apparently widely different embodiments of the present invention can be made without departing from the spirit and scope thereof, it is to be understood that the invention is not limited to the specific embodiments thereof except as defined in the appended claims.

What is claimed is:

1. An apparatus for making an outgoing call, comprising:

first recognition means for recognizing a first audio signal, judging whether a first recognition result is a personal ID or a first called party ID included in a first data table, and displaying a first message based on the personal ID or the first party ID;

second recognition means for recognizing a second audio signal, judging whether a second recognition result is a second called party ID included in a second data table, and displaying a second message based on the second called party ID; and calling means for making an outgoing call in accordance with one of the first and second called party IDs in response to a confirmation input;

wherein said second recognition means recognizes the second audio signal without the confirmation input in a case where the first recognition result is the personal ID.

2. An apparatus according to claim 1, wherein said recognition means output the recognition result.

3. An apparatus according to claim 1, wherein said setting means sets the one of the first mode and the second mode in a memory.

4. An apparatus according to claim 1, wherein said recognition means recognizes another audio signal in response to a reactivate input.

5. An apparatus according to claim 1, wherein said calling means includes key input means for inputting the confirmation input.

6. An apparatus according to claim 1, wherein said calling means makes the outgoing call in accordance with a called party data included in a telephone directory corresponding to the recognition result.

7. An apparatus according to claim 1, wherein said calling means includes image data transmission means.

8. An apparatus according to claim 1, wherein said recognition means displays the recognition result.

9. An apparatus according to claim 1, wherein said recognition means outputs character data as the recognition result.

10. An apparatus according to claim 1, wherein said recognition means extracts characteristics of the audio signal.

11. A method for making an outgoing call, comprising steps of:

first recognizing a first audio signal, judging whether a first recognition result is a personal ID or a first called party ID included in a first data table, and displaying a first message based on the personal ID or the first called party ID;

second recognizing a second audio signal, judging whether a second recognition result is a second called party ID included in a second data table, and displaying a second message based on the second called party ID; and making an outgoing call in accordance with a one of the first and second called party IDs in response to a confirmation input, wherein said second recognizing step recognizes the second audio signal without the confirmation input in a case where the first recognition result is the personal ID.

12. A method according to claim 11, wherein the recognition result is outputted.

13. A memory medium for storing a computer program comprising steps of:

first recognizing a first audio signal, judging whether a first recognition result is a personal ID or a first called party ID included in a first data table and displaying a first message based on the personal ID or the first called party ID;

second recognizing a second audio signal, judging whether a second recognition result is a second called party ID included in a second data table and displaying a second message based on the second called party ID; and making an outgoing call in accordance with one of the first and second called party IDs in response to a confirmation input wherein said second recognizing step recognizes the second audio signal without the confirmation input in a case where the first recognition result is the personal ID.

14. A method according to claim 13, wherein the recognition result is outputted.

* * * * *